(12) United States Patent
Mashiko

(10) Patent No.: US 6,624,614 B2
(45) Date of Patent: Sep. 23, 2003

(54) CHARGE AND DISCHARGE CONTROLLER

(75) Inventor: Takeshi Mashiko, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/078,862

(22) Filed: Feb. 19, 2002

(65) Prior Publication Data

US 2002/0113574 A1 Aug. 22, 2002

(30) Foreign Application Priority Data

Feb. 20, 2001 (JP) ........................................ 2001-044069
Jan. 10, 2002 (JP) ........................................ 2002-003493

(51) Int. Cl.[7] ................................................ H02J 7/00
(52) U.S. Cl. ...................................................... 320/128
(58) Field of Search ................................ 320/128, 132, 320/134, 135, 136, 139, 152

(56) References Cited

U.S. PATENT DOCUMENTS 5,808,446 A * 9/1998 Eguchi ....................... 320/134
6,118,253 A * 9/2000 Mukainakano et al. ..... 320/136
6,232,750 B1 * 5/2001 Podrazhansky et al. ..... 320/139

* cited by examiner

Primary Examiner—Edward H. Tso
Assistant Examiner—Pia Tibbits
(74) Attorney, Agent, or Firm—Adams & Wilks

(57) ABSTRACT

The present invention provides a rechargeable power source apparatus capable of performing the detection of a charge current with the overdischarge protection state being held and the detection of a discharge current with the overcharge protection state being held. For the detection of the charge current, the voltage developed across a resistance component of a charging switch of a switching circuit is utilized. Also, for the detection of the discharge current, the voltage developed across a resistance component of a discharging switch of the switching circuit is utilized. As a result, it is possible to perform the detection of the overcharge current in the overdischarge protection state and the detection of the overdischarge current in the overcharge protection state.

10 Claims, 2 Drawing Sheets

CHARGE AND DISCHARGE CONTROLLER

BACKGROUND OF THE INVENTION

1. Field of the invention

The present invention relates to a rechargeable power source apparatus which is capable of controlling charge and discharge of a secondary battery on the basis of ON/OFF of a switching circuit.

2. Description of the Related Art

As for a conventional charged power source apparatus including a secondary battery, there is known a charge and discharge controlling circuit as shown in a circuit block diagram of FIG. 2.

For example, such a configuration is disclosed in Japanese Patent Application Laid open No. Hei 4-75430 entitled "rechargeable power unit". That is, a secondary battery 101 is connected between an external terminal −Vo and an external terminal +Vo through a switching circuit 103. In addition, a charge and discharge controlling circuit 110 is connected in parallel with the secondary battery 110. This charge and discharge controlling circuit 110 has the function of detecting a voltage of the secondary battery 101.

When the secondary battery 101 is in the overcharge state (it means the state in which the voltage of the battery is higher than a predetermined voltage values hereinafter, this state is referred to as "the over-charge protection state", when applicable), a signal is outputted from the charge and discharge controlling circuit 110 in such a way as to turn OFF a charging switch 112 of the switching circuit 103.

On the other hand, when the secondary battery 101 is in the overdischarge state (it means the state in which the voltage of the battery is lower than a predetermined voltage value: hereinafter, this state is referred to as "the overdischarge protection state", when applicable), a signal is outputted from the charge and discharge controlling circuit 110 in such a way as to turn OFF a discharging switch 111 of the switching circuit 103. In addition, a charge current and a discharge current can be limited in such a way that the charge current or the discharge current is caused to flow through the switching circuit 103 having a resistance component, whereby the generated voltage of the external terminal −Vo is monitored to detect that this voltage has reached a certain voltage to turn OFF the switching circuit 103.

In other words, it is possible that when an excessive charge current is caused to flow, the charging operation is stopped (overcharge current control) and when an excessive discharge current is caused to flow, the discharging operation is stopped (overdischarge current control). Hereinafter, those states are respectively referred to as "the overcharge current protection state" and "the overdischarge current protection state" when applicable.

The charge and discharge controlling circuit operates to protect the battery from those states as described above.

SUMMARY OF THE INVENTION

In the case of the charge and discharge controlling circuit shown as the conventional example in FIG. 2, there arises the problem in that it is impossible to carry out the detection of the charge current with the overdischarge protection state being held, and the detection of the discharge current with the overcharge protection state being held.

Now, the problem in that it is impossible to carry out the detection of the charge current in the overdischarge protection state will hereinbelow be described specifically. Though in the overdischarge protection state, the discharging switch 111 shown in FIG. 2 is in the OFF state, in the case where a battery charger 105 is connected between the external terminal +Vo and the external terminal −Vo in this state, the charge current is caused to flow through the secondary battery 101, the discharging switch 111 and the charging switch 112.

However, since the discharging switch 111 is in the OFF state, the charge current is forcedly caused to flow through a parasitic diode of the discharging switch 111 (shown in FIG. 2 as a diode connected in parallel with the charging switch 111). As a result, the voltage at the external terminal −Vo is dropped by the voltage Vf across the parasitic diode, and in this state, it is impossible to accurately detect the overdischarge current.

The problem in that it is impossible to carry out the detection of the discharge current in the overcharge protection state is also similar to the impossibility of the detection of the charge current in the overdischarge protection state.

In the light of the foregoing, the present invention has been made in order to solve the above-mentioned problems associated with the prior art, and it is therefore an object of the present invention to make it possible to carry out the detection of the overcharge current in the overdischarge state and the detection of the overcharge current in the overcharge state by detecting with respect to the charge current, the voltage developed across a resistance component of the charging switch 112 and by detecting, with respect to the discharge current, the voltage developed across a resistance component of the discharging switch 111.

DETAILED DESCRIPTION OF THE PREFERRED EMBODIMENTS

Figure 1:
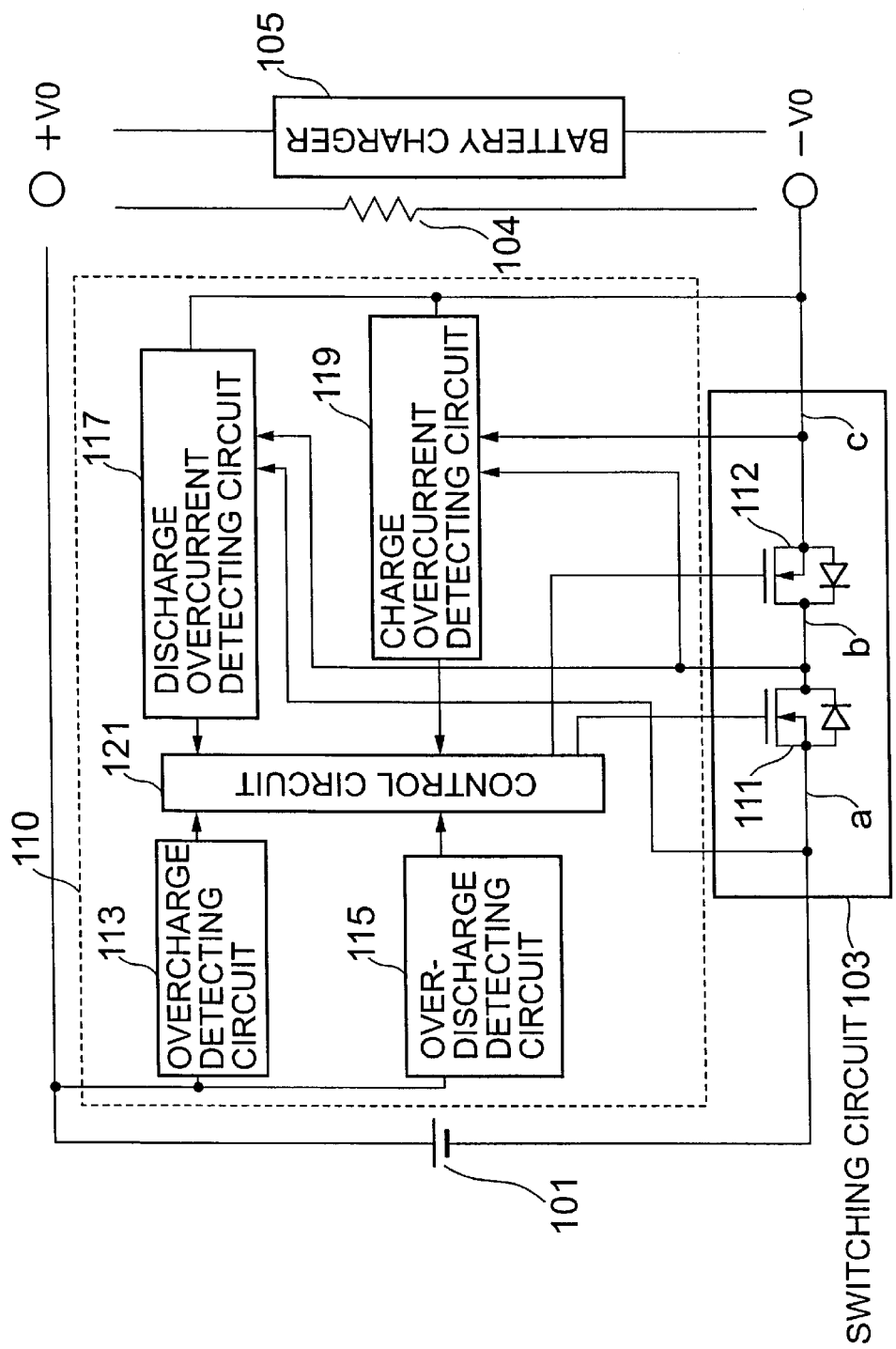
FIG. 1 is an explanatory circuit block diagram showing a configuration of a rechargeable power source apparatus according to the present invention.
Figure 2:
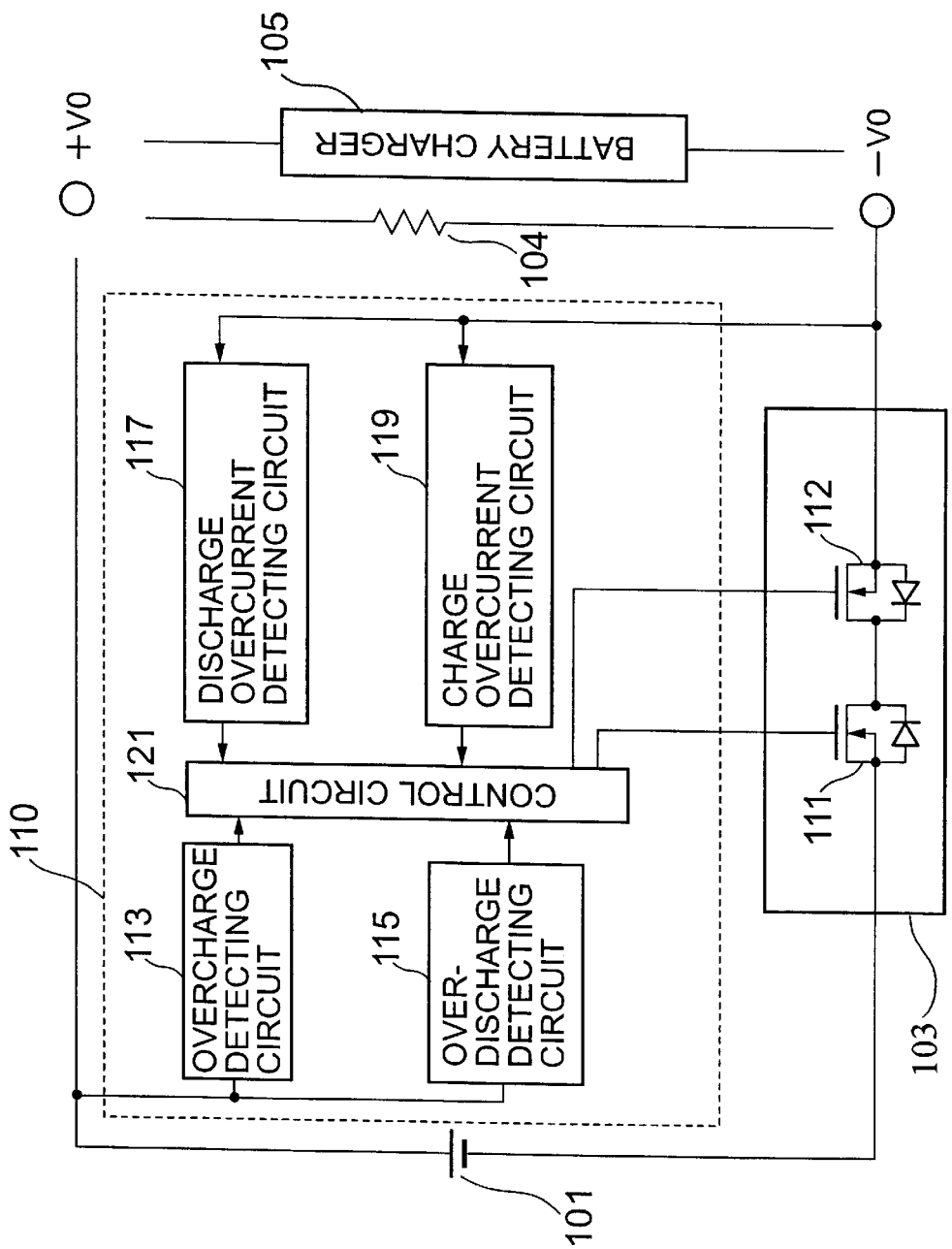
FIG. 2 is an explanatory block diagram showing a configuration of a conventional rechargeable power source apparatus.

FIG. 1 is a block diagram showing a configuration of a charge and discharge controlling circuit according to the present invention. An embodiment of the present invention will hereinafter be described in detail with reference to FIG. 1.

With respect to a configuration of a charge and discharge controlling circuit, an external terminal +Vo is connected to the positive voltage side of a secondary battery 101, and the negative voltage side of the secondary battery 101 is connected to an external terminal −Vo through a discharging switch 111 and a charging switch. 112 of a switching circuit 103.

In addition, a charge and discharge controlling circuit 110 having the function of detecting a voltage of the secondary battery 101 is connected in parallel with the secondary battery 101. This charge and discharge controlling circuit 110 includes an overcharge detecting circuit 113, an overdischarge detecting circuit 115, a overdischarge current detecting circuit 117, a overcharge current detecting circuit 119, and a control circuit 121.

As the basic operation of the charge and discharge controlling circuit 110, first of all, in the case where a battery charger 105 is provided between the external terminal +Vo and the external terminal −Vo, it is detected by the overcharge detecting circuit 113 that the voltage of the secondary battery 101 has become the overcharge states whereby the charging switch 112 is turned OFF through the control circuit 121 to stop the charge in the overcharge state.

In addition, the excessive charge current, which becomes a subject of discussion is caused to flow from the battery charger 105 to the secondary battery 101, whereby the difference between the electric potentials at points b and c due to a switching resistance of the charging switch 112 is detected by a overcharge current detecting circuit 119. As a result, the charging switch 112 is turned OFF through the control circuit 121 to stop the charge becoming the overcharge current state.

Next, in the case where a load 104 is provided between the external terminal +Vo and the external terminal −Vo, it is detected by the overdischarge detecting circuit 115 that the voltage of the secondary battery 101 has become the over charge state. As a result, the discharging switch 111 is turned OFF through the control circuit 121 to stop the discharge in the overdischarge state.

In addition, the excessive discharge current, which becomes a subject of discussion is caused to flow from the secondary battery 101 to the load 104, whereby the difference between the electric potentials at the points a and b due to a switching resistance of the discharging switch 111 is detected by a overdischarge current detecting circuit 117. As a result, the discharging switch 111 is turned OFF through the control circuit 121 to stop the discharge becoming the overdischarge current state.

Next, the operation of detecting the overcharge current in the overdischarge protection state in the present invention will hereinbelow be described in detail. In general, in the overdischarge protection state, the discharging switch 111 is in the OFF state. As a result, at the time when the battery charger 105 is provided between the external terminal +Vo and the external terminal −Vo in the overdischarge protection state, the charge current is caused to flow through the parasitic diode of the discharging switch 111 and the charging switch 112. Therefore, the voltage of the external terminal −Vo is dropped by the voltage VF across the parasitic diode and the overcharge current can be detected normally on the basis of the observation using the dropped voltage at the external terminal −Vo.

On the other hand, in the present invention, the difference between the electric potentials at the points b and c due to the switching resistance of the charging switch 112 is detected by the overcharge current detecting circuit 119. Note that, since the current which is caused to flow through the switching circuit 103 is the constant current, the detection of the difference between the electric potentials at the points b and c which is free from the influence of the state of the discharging switch 111 becomes possible. That is, it is possible to detect the overcharge current irrespective of the state of the discharging switch 111.

The above description of the detection of the overcharge current in the overdischarge protection state is also applied to that of the detection of the overdischarge current in the overcharge protection state.

In addition, the above description is also applied to the case where the circuit is provided which can be used both as the overdischarge current detecting circuit 117 and the overcharge current detecting circuit 119 of the present invention.

In addition, while the switching circuit 103 shown in FIG. 1 is provided on the side of the external terminal −Vo, the power source apparatus can also be realized in the case where the switching circuit 103 shown in FIG. 1 is provided on the side of the external terminal +Vo.

Also, in the case as well where a plurality of secondary batteries are connected in series with one another, similarly, it is also possible to realize the power source apparatus including a charge and discharge controlling circuit for detecting the overcharge and the overdischarge of each of the secondary batteries.

As set forth hereinabove, according to the present invention, it becomes possible to carry out the detection of the charge current with the overdischarge protection state being held and the detection of the discharge current with the overcharge protection state being held. For example, an effect can be provided such that a secondary battery is protected from the dangerous charge due to the abnormal connection of the battery charger, and the like in the secondary battery in the overdischarge state resulting from the self-discharge, and the dangerous discharge due to the overcharge state of the secondary battery resulting from the connection or the like of the battery charger which only serves to subject an A.C. current from an A.C. power source to the half-wave rectification.

While the present invention has been particularly shown and described with reference to the preferred embodiment and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A charge and discharge controller comprising:

external power source terminals;

a switching circuit connected in series with the external power source terminals;

a secondary battery connected across the external power source terminals in series with the switching circuit; and a charge and discharge controlling circuit connected in parallel with the secondary battery for detecting a state of the secondary battery and controlling the switching circuit in accordance with the detected state;

wherein the switching circuit comprises a discharging switch and a charging switch; the charge and discharge controlling circuit comprises a control circuit for controlling an ON/OFF state of the discharging switch and the charging switch on the basis of a detected voltage value of the secondary battery, an overcharge current detecting circuit for detecting an overcharge current during an overdischarge state of the secondary battery by measuring a voltage across a resistance associated with the charging switch, and an overdischarge current detecting circuit for detecting an overdischarge current during an overcharge state of the secondary battery by measuring a voltage across a resistance associated with the discharging switch; and wherein an output signal of the overcharge current detecting circuit and an output signal of the overdischarge current detecting circuit are input to the control circuit.

2. A charge and discharge controller according to claim 1; wherein the control circuit turns OFF the charging switch when the secondary battery is in an overcharge state in which the voltage of the secondary battery becomes higher than a certain level; and the overdischarge current detecting circuit detects the overdischarge current state and turns OFF the discharging switch during the overcharge state when an excessive discharge current is caused to flow through the switching circuit while the charging switch is OFF.

3. A charge and discharge controller according to claim 2; wherein the control circuit turns OFF the discharging switch when the secondary battery is in an overdischarge state in which the voltage of the secondary battery becomes lower than a certain level; and the overcharge current detecting circuit detects the overcharge current state and turns OFF the charging switch during the overdischarge state when an excessive charge current is caused to flow through the switching circuit while the discharging switch is OFF.

4. A charge and discharge controller according to claim 1; wherein the control circuit turns OFF the discharging switch when the secondary battery is in an overdischarge state in which the voltage of the secondary battery becomes lower than a certain level; and the overcharge current detecting circuit detects the overcharge current state and turns OFF the charging switch during the overdischarge state when an excessive charge current is caused to flow through the switching circuit while the discharging switch is OFF.

5. A charge and discharge controller according to claim 1; wherein the charging switch and the discharging switch are transistors and the resistances associated therewith are internal resistances of the transistors.

6. A charge and discharge controller according to claim 2; wherein the charging switch and the discharging switch are transistors and the resistances associated therewith are internal resistances of the transistors.

7. A charge and discharge controller according to claim 3; wherein the charging switch and the discharging switch are transistors and the resistances associated therewith are internal resistances of the transistors.

8. A charge and discharge controller according to claim 4; wherein the charging switch and the discharging switch are transistors and the resistances associated therewith are internal resistances of the transistors.

9. A rechargeable power supply comprising: a secondary battery; external connection terminals connected the secondary battery; a switching circuit connected in series with with the secondary battery and having a charging switch and a discharging switch for selectively disconnecting the secondary battery from the external connection terminals and a charge and discharge control circuit connected to the secondary battery for detecting a voltage of the secondary battery to determine whether the secondary battery is in an overcharge state or an overdischarge state, for detecting a current flowing in the secondary battery by detecting a voltage across an internal resistance of the charging switch or the discharging switch, and for outputting control signals to control ON/OFF states of the charging switch and the discharging switch according to the detected voltage and current.

10. A chargeable power supply according to claim 9, wherein the charge and discharge control circuit detects an overcharge current when the secondary battery is in an overdischarge state and an excessive current is caused to flow through the secondary battery by a battery charger connected to the external connection terminals.

* * * * *